(12) United States Patent
Everhart et al.

(10) Patent No.: US 7,574,439 B2
(45) Date of Patent: Aug. 11, 2009

(54) MANAGING A NESTED REQUEST

(75) Inventors: Craig F. Everhart, Chapel Hill, NC (US); Venkateswararao Jujjuri, Beaverton, OR (US); Ninad S. Palsule, Beaverton, OR (US); James J. Seeger, Jr., Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 10/849,656

(22) Filed: May 20, 2004

(65) Prior Publication Data
US 2005/0262159 A1    Nov. 24, 2005

(51) Int. Cl.
G06F 17/30    (2006.01)

(52) U.S. Cl. ............... 707/8; 707/2; 719/313; 719/314; 719/315

(58) Field of Classification Search ........ 707/1–2, 707/8–9, 100–201, 204, 205–206; 711/147–148, 711/156, 150, 157; 709/223–224, 203, 330, 709/229; 714/4, 55; 718/100, 102, 107; 710/200, 220; 719/313–315; 712/245; 717/149, 717/106
See application file for complete search history.

(56) References Cited

U.S. PATENT DOCUMENTS

| | | | |
|---|---|---|---|
| 5,016,167 A | 5/1991 | Nguyen et al. ........... 364/200 |
| 5,303,368 A | 4/1994 | Kotaki ..................... 395/650 |
| 5,706,515 A | 1/1998 | Connelly et al. ......... 395/676 |
| 5,752,031 A * | 5/1998 | Cutler et al. ............. 718/103 |
| 6,003,066 A * | 12/1999 | Ryan et al. ............... 709/201 |
| 6,122,712 A | 9/2000 | Torii ....................... 711/141 |
| 6,247,121 B1 * | 6/2001 | Akkary et al. ........... 712/239 |
| 6,418,460 B1 * | 7/2002 | Bitar et al. .............. 718/108 |
| 6,427,161 B1 * | 7/2002 | LiVecchi ................. 718/102 |
| 6,438,551 B1 | 8/2002 | Holmskar ................ 707/10 |
| 6,477,561 B1 * | 11/2002 | Robsman ................ 718/105 |
| 6,529,962 B1 | 3/2003 | Azagury et al. ......... 709/330 |

(Continued)

FOREIGN PATENT DOCUMENTS

EP    1308839    *    5/2003    ............. 9/46

(Continued)

OTHER PUBLICATIONS

K.Debattista et al. "wait-free cache-affinity thrad scheduling", IEE proc.Softw, vol. 150,No.2, Apr. 2003, pp. 137-146.*

(Continued)

*Primary Examiner*—Khanh B Pham
(74) *Attorney, Agent, or Firm*—Lieberman & Brandsdorfer, LLC

(57) ABSTRACT

A method and system for managing availability of a dependent thread to service a nested request is provided. A plurality of reply threads are maintained in a single thread pool. In addition, a counter is provided to track availability of a reply thread from the thread pool. A service thread that requires at least one reply thread to complete execution of a request must check the counter to determine availability of the reply thread prior to execution of the request. The process of determining availability of a reply thread prior to execution of a service thread request avoids initiating execution of a request that cannot be completed in a timely manner, or at all.

17 Claims, 4 Drawing Sheets

U.S. PATENT DOCUMENTS

| | | | |
|---|---|---|---|
| 6,769,122 B1* | 7/2004 | Daudel | 718/102 |
| 6,950,927 B1* | 9/2005 | Apisdorf et al. | 712/216 |
| 7,013,400 B2* | 3/2006 | Kalla et al. | 713/320 |
| 7,093,230 B2* | 8/2006 | E et al. | 717/100 |
| 7,137,115 B2* | 11/2006 | Sakamoto et al. | 718/102 |
| 7,139,781 B2* | 11/2006 | Young et al. | 707/204 |
| 2001/0010052 A1* | 7/2001 | Sakamoto et al. | 709/100 |
| 2002/0078121 A1* | 6/2002 | Ballantyne | 709/102 |
| 2002/0124241 A1* | 9/2002 | Grey et al. | 717/149 |
| 2002/0194377 A1 | 12/2002 | Doolittle et al. | 709/246 |
| 2003/0088609 A1 | 5/2003 | Guedalia et al. | 709/107 |
| 2003/0145035 A1 | 7/2003 | de Bonet | 709/102 |
| 2004/0019639 A1* | 1/2004 | E et al. | 709/205 |
| 2004/0019892 A1* | 1/2004 | E. et al. | 718/107 |
| 2004/0078779 A1* | 4/2004 | Dutt et al. | 717/106 |
| 2004/0139433 A1* | 7/2004 | Blythe et al. | 718/100 |
| 2004/0210902 A1* | 10/2004 | Such | 718/104 |
| 2004/0220976 A1* | 11/2004 | Ananthanarayanan et al. | 707/201 |
| 2004/0230877 A1* | 11/2004 | Clark et al. | 714/48 |

FOREIGN PATENT DOCUMENTS

| | | | |
|---|---|---|---|
| JP | 2230429 | | 9/1990 |
| JP | 3174633 | | 7/1991 |
| WO | WO 03/014864 | * | 2/2003 |

OTHER PUBLICATIONS

Thomley, J et al. "Monotonic counter: a new mechanism for thread synchronization", IPDPS 2000 14th international proceedings, parallel and distributed processing symposium, 2000, pp. 573-582.*

Karablieh, F et al. "Heterogeneous checkpointing for multithreaded applications", 21st IEEE symposium on reliable distributed systems, 2002, pp. 140-149.*

Sundell, H et al. "fast and lock-free concurrent priority queues for multi-thread systems", International proceedings, parallel and distributed processing symposium, 2003.*

* cited by examiner

MANAGING A NESTED REQUEST

BACKGROUND OF THE INVENTION

1. Technical Field

This invention relates to managing requests in a computer system. More specifically, the invention relates to ensuring that a thread will be available to process a request prior to initiating execution of the request.

2. Description of the Prior Art

In a distributed computer system with shared persistent storage, one or more server nodes are in communication with one or more client nodes. FIG. 1 is a block diagram (10) illustrating one example of a distributed computer system. As shown, there are two server nodes (12) and (14), three client nodes (16), (18), and (20), and a storage area network (5) that includes one or more storage devices (not shown). Each of the client nodes (16), (18), and (20) may access an object or multiple objects stored on the file data space (27) of the storage area network (5), but may not access the metadata space (25). In opening the contents of an existing file object on the storage media of the storage device in the storage area network (5), a client contacts the server node to obtain metadata and locks. Metadata supplies the client with information about a file, such as its attributes and location on the storage devices. Locks supply the client with privileges it needs to open a file and read or write data. The server node performs a look-up of metadata information for the requested file within the metadata space (25) of the storage area network (5). The server nodes (12) or (14) communicate granted lock information and file metadata to the requesting client node, including the location of the data blocks making up the file. Once the client node holds a distributed lock and knows the data block location(s), the client can access the data for the file directly from a shared storage device attached to the storage area network.

In the distributed computing system of FIG. 1, there are finite quantities of execution threads available for the servers and/or clients in executing requests. A multi-stage request, also known as a nested request, will require a first execution thread to request a second execution thread in order to complete the request. In the nested request, the first execution thread will suspend operation while it waits for a reply from the second execution thread. For example, one of the client nodes may initiate a first request for a lock that will require a response from one of the server nodes. A problem may be encountered when a first thread has been executed by one of the servers for the first request, and one of the other client nodes initiates a second request for service and no second execution thread is available for the second request. This scenario is known as a deadlock. In order to avoid a deadlock scenario the first thread must know that the second thread will be available for execution prior to the first thread committing to the execution of a request.

One prior art solution is to reserve a quantity of threads in a thread pool, wherein the reserved threads are exclusively for use with secondary requests in a nested request. By reserving a quantity of threads for use as secondary requests in a nested request, an operator mitigates a deadlock situation associated with a nested request and encourages availability of threads to complete the nested request. However, there are drawbacks associated with reserving a pool of threads exclusively for secondary requests of a nested request. A quantity of threads in a multithreaded processing system is statically generated. As such, there are a finite number of threads available. One drawback is designating a defined quantity of threads for secondary requests without prior knowledge as to whether a first execution thread is part of a nested request. If the reserved threads are not available for other requests, the availability of threads for all requests is reduced. Accordingly, in a system with a predefined quantity of threads, reserving a set quantity of threads for servicing secondary requests is not an efficient allocation of threads.

Another prior art solution, U.S. patent Publication 2002/0194377 to Doolittle et al., uses multiple pools, i.e. data structures, for holding threads, wherein different pools are reserved for different stages in a nested request. Threads are redistributed among thread pools when a potential exhaustion of a pool is discovered. Accordingly, the quantity of available threads among a plurality of thread pools is dynamically modified in order to honor all service requests.

However, there are limitations associated with what is disclosed in the Doolittle et al. publication. For example, management of threads in the manner taught by Doolittle et al. can be complex and expensive to operate. There is therefore a need for management of threads in a system that supports nested requests that does not require any added expense. In addition, such a solution should make all threads eligible to support any stage in a nested request.

SUMMARY OF THE INVENTION

This invention comprises a method and system for management of threads in a distributed computer system.

In one aspect of the invention, a method is provided for managing a computer system. Commitment of a service thread to servicing a request depending on an external reply thread is monitored. Availability of reply threads in a single thread pool is tracked.

In yet another aspect of the invention an article is provided in a computer-readable recordable data storage medium. Instructions are provided in communication with the medium to manage execution of a nested request. The instructions include configuration of a thread pool with a nested request wherein a service thread is dependent on a separate second execution thread to complete the request. In addition, instructions are provided to track availability of the second execution thread to complete the nested request, and to commit the service thread to the nested request based upon the availability of the second execution thread. Availability of the reply thread from the thread pool is tracked prior to commitment of the service thread to the request.

Other features and advantages of this invention will become apparent from the following detailed description of the presently preferred embodiment of the invention taken in conjunction with the accompanying drawings.

DESCRIPTION OF THE PREFERRED EMBODIMENT

Overview

In a computer system, a plurality of threads are statically generated to satisfy requests. A nested request is a request which requires at least two non-concurrently executing threads for completion of execution of associated instructions. A first thread, known as a service thread, will require at least one second thread, known as a reply thread, for completion of the request. In an efficient system, a service thread that is part of a nested request will not begin execution until it is guaranteed that a reply thread will be available for completion of the request.

Technical Details

Threads represent a single sequence of instructions executed in parallel with other sequences. A set quantity of threads is generated when the associated computer system is configured. A data structure that maintains threads is also known as a thread pool. Requests are sent to the thread pool. Each task request to the thread pool is executed by one of the threads. If there are more requests than threads, the requests are placed in a queue in order to be serviced.

Figure 1:
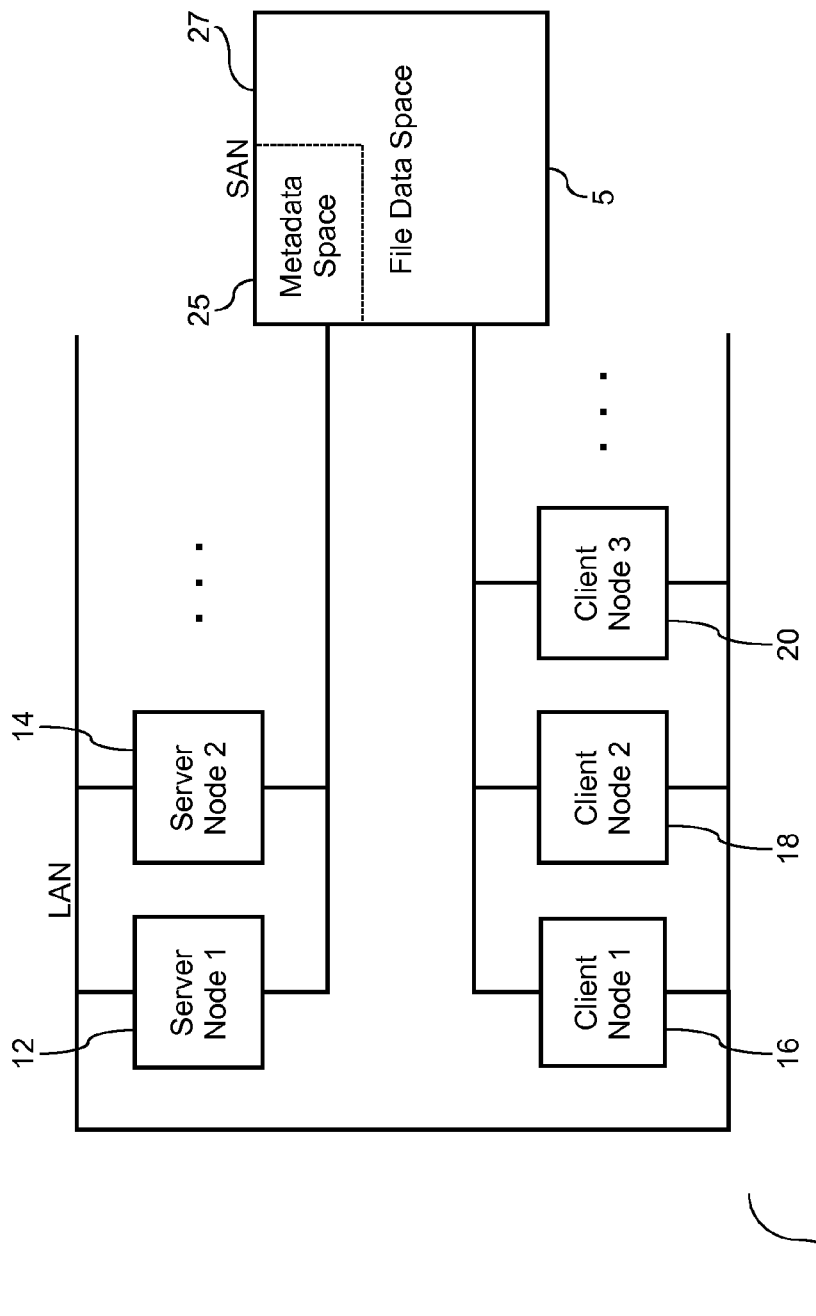
FIG. 1 is a prior art block diagram of a distributed computing system.
Figure 2:
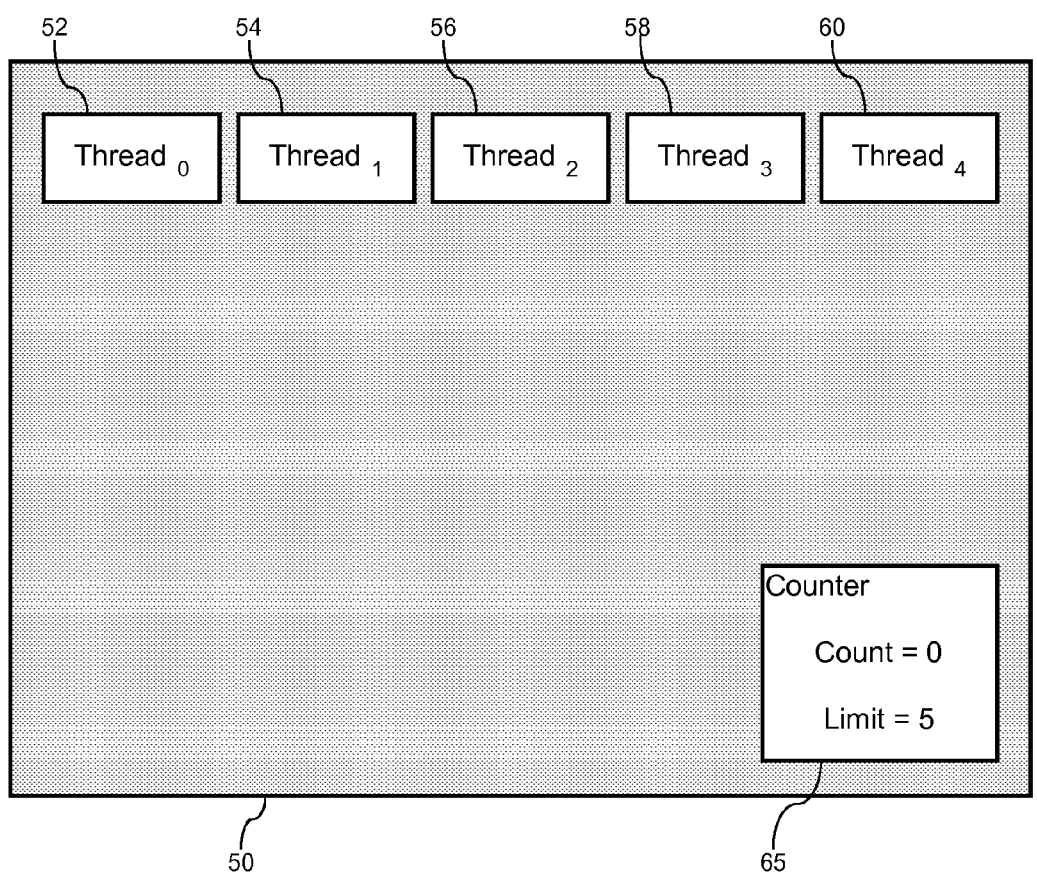
FIG. 2 is a block diagram of a thread pool.

FIG. 2 is a block diagram of a reply thread pool (50). As shown, there are five threads (52), (54), (56), (58), and (60), and a counter (65). Although five threads are shown in FIG. 2, it should be noted that the thread pool (50) may include more or less than five threads. Each of the threads (52), (54), (56), (58), and (60) may be used to service any type of request. In one embodiment, the threads in thread pool (50) are dependent service threads for servicing additional dependent requests and response threads that complete servicing a request. For example, in the case of a request that requires an external reply serviced by another thread, additional threads may be requested from the reply thread pool (50). As shown in FIG. 2, the counter (65) is set to zero, as an indication that all of the threads in the thread pool (50) are available to service requests. As a thread is requested and granted, the counter (65) is incremented. Similarly, as a reply thread, i.e. a thread housed in the thread pool (50), completes execution of a request, the reply thread is returned to the thread pool (50), and the counter (65) is decremented. Accordingly, the thread pool includes a static quantity of threads in conjunction with a counter to track availability of a thread for servicing any request.

Figure 3:
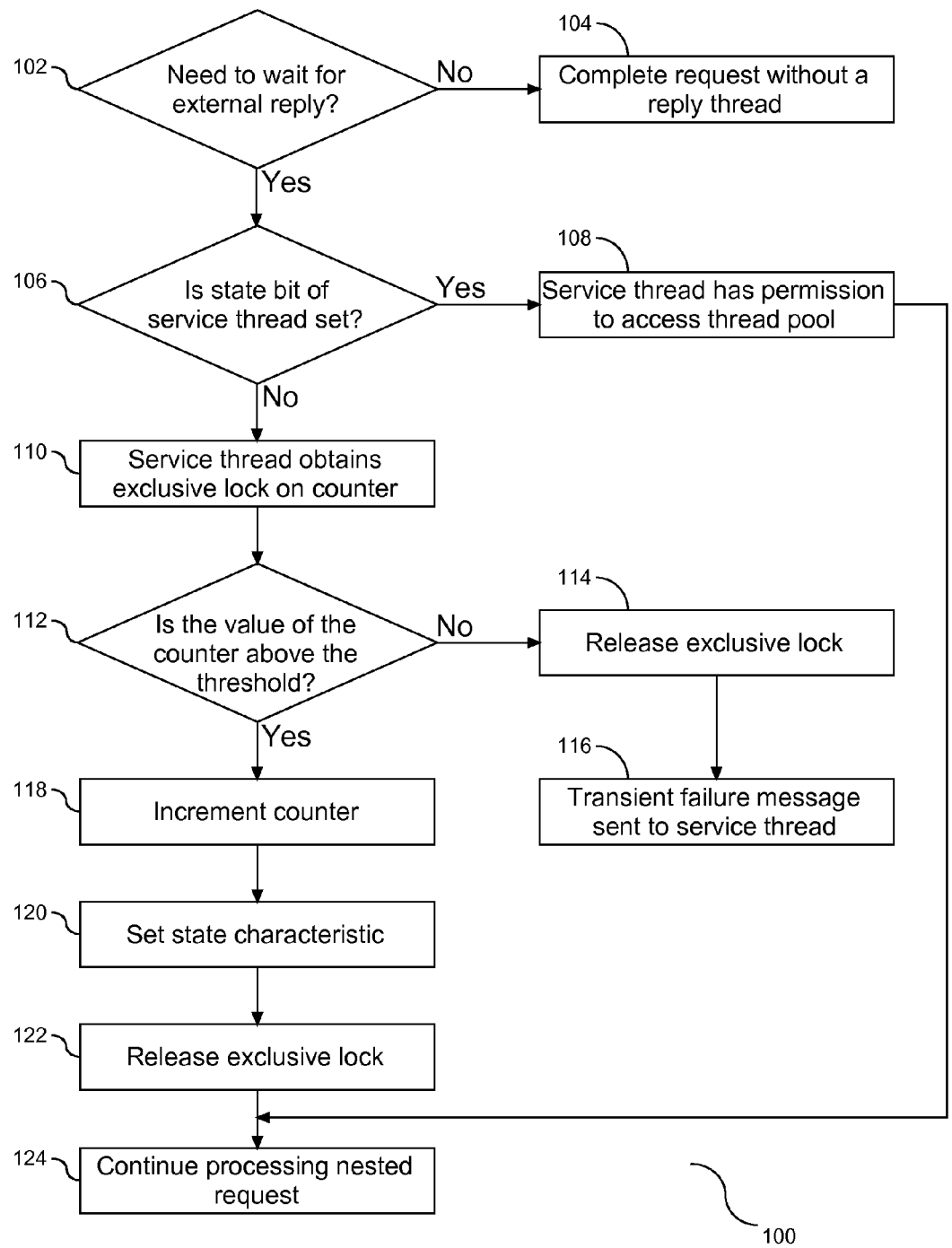
FIG. 3 is a flow chart illustrating dispatch of a reply thread to a service thread according to the preferred embodiment of this invention.

FIG. 3 is a flow chart (100) illustrating one embodiment in how the thread pool (50) may be utilized for a request that requires an external reply supplied by at least one additional thread. The first step is to conduct a test to determine if a request requires an external reply to be serviced by one or more additional threads for completion of the request (102). A negative response to the test at step (102) is an indication that the request is not a nested request and the service thread does not require a reply thread for completion of the request (104). However, a positive response to the test at step (102) is an indication that the request is a nested request and requires at least one additional reply thread to complete the request. Each thread has a bit that characterizes its ability to service a nested request, i.e. a state bit. Following a positive response to the test at step (102), a subsequent test is conducted to determine if a state bit of the requesting thread, also known as a service thread, is set for commitment to execution (106). A negative response to the test at step (106) is an indication that the service thread is capable of servicing a nested request and that it may proceed with seeking a request to access the pool of threads (50). However, a positive response to the test at step (106) is an indication that the service thread already has permission to access the pool of threads (108) and may continue to process the nested request (124). Accordingly, the first step in accessing a pool of threads for completion of a request entails determining whether such access is required.

Once it has been determined that the service thread requires one or more threads to complete the request, the service thread obtains an exclusive lock on the counter of the thread pool (110). The counter has a threshold value that corresponds to the maximum quantity of threads in the pool. A test is conducted to determine if the value of the counter is below the threshold limit of the counter (112). If the value of the counter has reached the threshold, this is an indication that there are no threads available from the thread pool (50) for completion of the request. Following a negative response to the test at step (112), the exclusive lock on the counter is release by the service thread (114), and a transient failure message, i.e. an abort message, is sent to the service thread that initiated the thread request and the reply thread is returned to the thread pool (116). However, if it is determined at step (112) that the value of the counter is below the threshold limit, the counter is incremented (118) and the state characteristic of the service thread is set (120) to indicate that the service thread is committed to the execution of the request. In one embodiment, a state characteristic may be a bit that identifies commitment of a thread to a request. Following step (120) the service thread releases the exclusive lock on the counter (122) and continues to process the nested request (124). Accordingly, prior to initiating execution of a request, the service thread ensures availability of at least one additional thread and sets a self identifier indicating commitment of the service thread to completion of the request.

Figure 4:
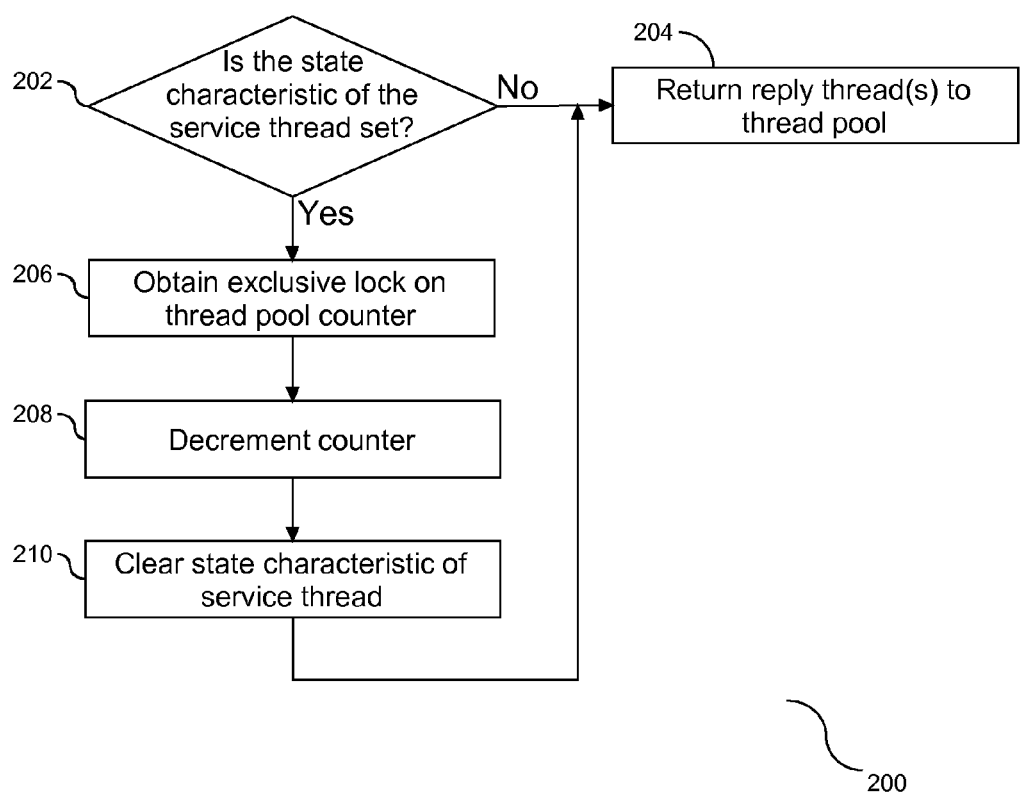
FIG. 4 is flow chart illustrating return of a reply thread to the thread pool following completion of the task.

Following step (118), the service thread may continue with the request, knowing that all the threads it requires have been reserved from the thread pool (50). FIG. 4 is a flow chart (200) illustrating the process of releasing a reply thread following completion of the nested request. A test is conducted to determine if the state characteristic of the service thread is set (202). If the response to the test at step (202) is negative, this is an indication that the service thread has completed the request and does not continue to own any threads that belong to the thread pool. All reply threads that may have been requested by the service thread are returned to the thread pool (204). However, if the response to the test at step (202) is positive, this is an indication that the service thread is in the process of completing the execution of the task associated with the threads. The service thread obtains an exclusive lock on the counter of the thread pool (206). Thereafter, the counter is decremented (208), and the state characteristic of the service thread is set to indicate that the service thread is not committed to execution of a request (210). Once step (210) is complete, the service thread returns the reply thread to the thread pool (204). Accordingly, following completion of the request that requires one or more additional threads to service an external reply, all threads are returned to the thread pool together within an accounting reflecting the returned threads.

Advantages Over the Prior Art

The method and system shown herein enable efficient allocation of threads for use in a nested request while avoiding a deadlock scenario. All of the threads are maintained in a single thread pool that has a counter associated therewith to track the quantity of threads in the data structure at any one time. In addition, each service thread has an identifier to indicate whether the thread is committed to a request. Once availability of a thread from the thread pool has been confirmed, the identifier of the service thread is marked to note commitment of the thread to the associated request. Accordingly, the combination of the thread pool with the service thread identifier ensures that execution of a nested request is not initiated until it has been determined that the necessary resources are available to complete the nested request.

Alternative Embodiments

It will be appreciated that, although specific embodiments of the invention have been described herein for purposes of illustration, various modifications may be made without departing from the spirit and scope of the invention. In particular, a nested or non-nested request may require multiple threads from the thread pool for completion of the request(s). The counter of the thread pool may be incremented by the quantity of threads required for completion of the request(s). In addition, as more clients and/or servers are added to the distributed computer system, threads may be added to the thread pool by the additional clients and/or servers. Finally, the thread pool counter described herein is a counter of committed threads. However, the counter may be functionally replaced by a counter of uncommitted threads with suitable modifications to the operation that initialize, update, and examine the state of the counter. Accordingly, the scope of protection of this invention is limited only by the following claims and their equivalents.

We claim:

1. A method for managing a computer system, comprising:
   configuring a computer system with at least two threads to service; a request, said request being a nested request that utilizes a service thread to initiate said nested request and a second execution thread in order to complete said nested request, with said service thread being separate from said second execution thread;
   prior to starting execution of said service thread, tracking availability of said second execution thread to complete said nested request;
   starting execution of said service thread of said nested request responsive to said second execution thread being available, and halting execution of said service thread of said nested request responsive to said second execution thread being unavailable; and
   limiting execution of said service thread and said second execution thread to consecutive execution to complete said nested request, including executing said second execution thread after completion of execution of said service thread.

2. The method of claim 1, wherein the step of tracking availability of said second execution thread includes checking a counter of committed threads from a thread pool prior to execution of said service thread.

3. The method of claim 2, further comprising aborting said service thread responsive to said counter having a value above a threshold.

4. The method of claim 2, further comprising committing said service thread to said request responsive to said counter having a value below a threshold.

5. The method of claim 4, wherein the step of executing said service thread of said nested request includes incrementing said counter and changing a state characteristic of said service thread to be committed to said nested request.

6. The method of claim 5, further comprising decrementing said counter and changing said state characteristic of said service thread to available after completion of execution of said second execution thread.

7. A computer system, comprising:
   a processor in communication with storage media;
   at least two threads to execute a single nested request from said processor to access said storage media;
   said nested request having a service thread to initiate said request and a separate second execution thread to complete said nested request;
   a manager to track availability of said second execution thread to complete said nested request prior to a start of execution of said service thread;
   said manager to start execution of said service thread of said nested request in response to said second execution thread being available, and said manager to halt execution of said service thread in response to said second execution thread being unavailable, wherein said manager limits execution of said service thread and said second execution thread to consecutive execution including an execution of said second execution thread after completion of execution of said service thread.

8. The system of claim 7, further comprising a counter to track availability of said second execution threads in a thread pool, wherein said manager reviews said counter prior to execution of said service thread.

9. The system of claim 8, further comprising an abort function to be invoked in response to said counter having a value above a threshold.

10. The system of claim 8, further comprising an execution function to increment said counter and change a state characteristic of said service thread to unavailable in response to said counter having a value below a threshold.

11. The system of claim 10, further comprising said counter increased and a state characteristic of said service thread changed to available in response to completion of execution of said second execution thread.

12. An article comprising:
    a computer readable recordable data storage medium, including instructions configured to manage execution of nested requests in a computer system, said instructions comprising:
    instructions to configure a computer system with a thread pool to service a request to storage media, said request including a nested request that utilizes a service thread to initiate said nested request and a separate second execution thread to complete said nested request, with said service thread being separate from said second execution thread;
    prior to starting execution of said service thread, instructions to track availability of said second execution thread to complete said nested request; and
    instructions to start execution of said service thread of said nested request in response to said second execution thread being available, and halting execution of said service thread of said nested request responsive to said second execution thread being unavailable, including limiting execution of said service thread and said second execution thread to consecutive execution to complete said nested request, wherein the second execution thread is executed after completion of execution of said service thread;
    executing said nested request with said service thread and said available second execution thread.

13. The article of claim 12, wherein said instructions to track availability of said second execution thread includes reviewing a counter of available second execution thread, and prior to execution of said service thread.

14. The article of claim 13, further comprising instructions to abort said service thread in response to said counter having a value above a threshold.

15. The article of claim 13, further comprising instructions to commit said service thread to said process in response to said counter having a value below a threshold.

16. The article of claim 15, wherein said instructions to commit said service thread to said process includes decrementing said counter and changing a state characteristic of said service thread to unavailable.

17. The article of claim 16, further comprising instructions to increase said counter and to change said state characteristic of said service thread to available after completion of execution of said second execution thread.

* * * * *